United States Patent Office 2,776,870
Patented Jan. 8, 1957

2,776,870

CORROSION PREVENTION IN GAS RECOVERY SYSTEMS

Paul W. Fischer, Whittier, Calif., assignor to Union Oil Company of California, Los Angeles, Calif., a corporation of California No Drawing. Application November 27, 1953, Serial No. 394,894

20 Claims. (Cl. 23—2)

This invention relates to corrosion prevention, and in particular concerns new and improved methods for preventing the corrosion of ferrous metals in gas treating systems wherein certain amines or alkanol amines are employed as selective absorbents. It further relates to inhibited absorbents for the selective removal of acidic gases from gas mixtures.

One of the more widely used processes for treating gases for the removal of acidic constituents such as hydrogen sulfide and carbon dioxide makes use of aqueous amines or alkanol amines as selective absorbents for such constituents. Such process comprises contacting the gas to be purified with an aqueous solution of an aliphatic amine or alkanol amine in a conventional absorption tower, whereby the acidic components of the gas mixture selectively dissolve in the absorbent. The rich absorbent is transferred to a suitable vessel or tower wherein it is regenerated by heating to drive off the dissolved acidic gas, and the regenerated or lean absorbent is cooled and returned to the absorption tower for use in extracting the acidic components from a further quantity of the feed gas. The compounds which are so employed as selective absorbents are water-soluble aliphatic amines or alkanol amines which are free from carboxyl and carbonyl groups and which boil above about 100° C. They are usually employed in the form of 10–50 percent aqueous solution, with alkanol amines containing from 2 to 9 carbon atoms, particularly mono-, di- and triethanolamines, being preferred.

While such use of amines and alkanol amines to separate acidic constituents from gas mixtures has been successfully applied in many large-scale installations, in some instances it has proved unsatisfactory by reason of corrosion difficulties. These difficulties appear to be greatest in situations where the gas being treated contains relatively large amounts of carbon dioxide and water and small amounts of free oxygen. For example, in a typical installation wherein natural gas from the Santa Maria district of California is treated with aqueous monoethanolamine, steel test coupons inserted into the system are corroded at a rate of almost 0.03 inch penetration per year, and complete replacement of heat exchanger bundles and parts of the regeneration tower is required after only a few years operation. Also, the absorbent becomes so contaminated with corrosion products that it must be continuously purified by distillation.

It is accordingly an object of this invention to provide a means for preventing the corrosion of ferrous metals in systems comprising organic amines and acidic gases.

Another object is to provide an improved process for the removal of acidic contaminants from gases.

A further object is to provide an improved process for purifying natural gas.

A still further object is to provide inhibited amine or alkanol amine absorbents suitable for use in processing gas mixtures for the removal of acidic constituents therefrom.

Other and related objects will be apparent from the following detailed description of the invention, and various advantages not specifically referred to herein will occur to those skilled in the art upon employment of the invention in practice.

I have now found that the above and related objects may be realized through the use of certain metal soaps of carboxylic or sulfonic acids in combination with products of reaction between fatty acids or oils and certain alkanol amines as corrosion inhibitors. More particularly, I have found that the corrosion of ferrous metals in systems comprising the aforementioned amines or alkanol amines and acidic gases such as hydrogen sulfide and carbon dioxide may be effectively inhibited by introducing into the system small amounts of a heavy metal carboxylic or sulfonic acid soap and a product obtained by reacting a fatty acid or a fatty oil with an alkanol amine at an elevated temperature. The soap and reaction product may be introduced into the system as separate entities or they may be combined to form a corrosion inhibiting composition which can be stored and shipped as such and introduced into the system as a single entity. Also, the soap and reaction product may be added to an amine or alkanol amine of the aforementioned type to form an inhibited absorbent for use in the selective removal of acidic constituents from gases. As is hereinafter more fully explained, various other agents may be employed in conjunction with the soap and reaction product to supplement the corrosion inhibiting effect thereof.

The metal soaps which are suitable for use in accordance with the invention are the alkaline-earth and heavy metal soaps of carboxylic acids containing at least about 8 carbon atoms or of oil-soluble petroleum sulfonic acids. As is well known, the latter are generally referred to as "mahogany acids," and are obtained by the treatment of various petroleum fractions with strong sulfuric acid. The carboxylic acids may be resin acids, such as abietic acids, rosin, tall oil, etc., naphthenic acids, such as are isolated from certain types of petroleum, or fatty acids such as pelargonic, lauric, oleic, palmitic, ricinoleic and stearic acids. The metals which are combined with said acids to form the soaps of the present class are those of groups I–B and II–VIII, inclusive, of the periodic table, e. g., copper, calcium, magnesium, zinc, barium, mercury, cadmium, aluminum, titanium, tin, lead, vanadium chromium, iron, nickel, cobalt, manganese, etc. As specific examples of the soaps of the present class there may be mentioned copper naphthenate, zinc stearate, calcium petroleum sulfonate, magnesium resinate, barium palmitate, aluminum mono-stearate, chromium naphthenate, manganese resinate, iron petroleum sulfonate, nickel laurate, lead ricinoleate, cadmium oleate, titanium phenylstearate, tin naphthenate, copper octoate, etc. Mixtures of such soaps may also be employed. Lead soaps are preferred, and lead naphthenate in particular has proved outstanding.

The reaction products which are employed in conjunction with the soaps of the present class in accordance with the invention are obtained by reacting a fatty acid containing at least about 8 carbon atoms, or a fatty oil which contains fatty acid radicals containing at least about 8 carbon atoms, with an alkanol amine containing between 2 and about 20 carbon atoms. As examples of the fatty acids which may be employed in preparing such reaction products there may be mentioned pelargonic, oleic, palmitic, stearic, linoleic, linolenic, lauric, myristic, cerotic and eleostearic acids. Suitable fatty oils include castor oil, mehaden oil, linseed oil, tung oil, cottonseed oil, coconut oil etc. Castor oil acids and castor oil are preferred. Suitable alkanol amines include mono-, di- and triethanolamines, di-n-propanolamine, di-iso-butanolamine, diethylethanolamine, tri-tert. butanolamine, monododecanolamine, ethyl di-iso-propanolamine, di-n-octanolamines, tri-isopentanolamine, hydroxyethoxy-ethylamine, dihydroxy-propylamine, etc. The ethanolamines, particularly diethanolamine, are preferred.

The reaction products of the aforesaid fatty acids or oils with the aforesaid alkanol amines are obtained simply by heating the two reactants at a temperature between about 100° C. and about 320° C., preferably between about 150° C. and about 280° C., while distilling water and other volatile substances from the mixture until substantially the stoichiometric amount of water has been removed. The time required is usually between about ½ and about 10 hours, depending to a large extent upon the identity of the fatty material. If desired, the reaction may be carried out in the presence of a catalytic amount, e. g. 0.05–1.0 percent based on the weight of the reactants, of an alkali such as sodium hydroxide or sodium carbonate. Between about 0.5 and about 5 moles of the fatty acid or fatty oil are employed per mole of the alkanol amine. Upon completion of the reaction the product is allowed to cool, whereupon it takes the form of a yellowish-brown highly viscous liquid or semi-solid which may be employed directly and without further treatment in accordance with the invention.

The amounts in which the soap and reaction product are employed in accordance with the invention should of course be sufficient to effect a substantial degree of corrosion inhibition, which amount will depend upon primarily the nature of the amine or alkanol amine absorbent, the conditions of temperature and pressure under which it is employed, and the nature of the gas mixture being treated. Usually, the combined weight of the soap and reaction product, plus that of any of the hereinafter described supplemental agents, will be between about 0.05 and about 2 percent of the weight of the amine or alkanol amine absorbent. The ratio in which the soap and reaction product are employed may be varied over relatively wide limits, e. g. the combination may comprise between about 15 and about 85 percent by weight of the soap and between about 85 and about 15 percent by weight of the reaction product.

According to one embodiment of the invention, the objects thereof are attained simply by adding the requisite amounts of the soap and reaction product to the absorbent at any desired point in the system. Alternatively, the soap and reaction product may be combined to form a corrosion inhibiting composition which can be stored and shipped as such as introduced into the gas treating system as a single entity. Such compositions are conveniently prepared with the aid of a solvent to promote compatibility of the soap and reaction product, and will ordinarily comprise between about 20 and about 80 percent of the soap and the reaction product and between about 80 and about 20 percent of the solvent. Light petroleum distillates are eminently satisfactory for use as the solvent, although any organic solvent capable of dissolving the soap and reaction product is suitable. Such compositions may also comprise any or several of the supplemental agents described hereinafter.

As previously stated, the invention also relates to corrosion inhibited absorbents for use in gas treating systems. Such absorbents are obtained simply by dispersing the soap and reaction product in one of the amine or alkanol amine absorbents of the present class. The amount of soap and reaction product employed corresponds to that previously given, and the inhibited absorbent may also comprise supplemental corrosion inhibitors, foam inhibitors, etc. A composition of this type which is particularly useful in separating carbon dioxide from gaseous mixtures comprises a 10–30 percent aqueous solution of monoethanolamine containing about 0.05–0.5 percent by weight of the reaction product, about 0.05–0.5 percent by weight of lead naphthenate, about 0.01–0.25 percent by weight of a long-chain alkylamine and 0.01 to 0.1 percent by weight of a drying oil.

Among the agents which may be employed to supplement the corrosion inhibiting action of the metal soap and reaction product, long-chain aliphatic and cycloalkyl amines containing at least about 10 carbon atoms and their salts form a preferred class. As examples of these agents there may be mentioned laurylamine, hexadecylamine, oleylamine, heptadecylamine acetate, cyclohexylamine, dicyclohexylamine nitrite, etc. Drying oils, such as linseed oil, tung oil, hemp oil, etc. may also be advantageously employed. Each of such supplemental agents may suitably be employed in amounts up to the combined weights of the soap and reaction product.

The following examples will illustrate the formulation of a number of inhibited absorbents of the present class, but are not to be construed as limiting the invention. All proportions are given as parts by weight.

Example I

Approximately 140 parts of oleic acid and 74 parts of triethanolamine are heated for one hour at reflux temperature. The resulting reaction product is employed in preparing the following compositions:

| Composition No. | 1 | 2 | 3 | 4 | 5 | 6 | 7 |
|---|---|---|---|---|---|---|---|
| Water | 2,500 | 2,000 | | | 2,700 | 2,400 | 2,700 |
| Monoethanolamine | 500 | | | | 330 | | 800 |
| Diethanolamine | | 800 | | | | 600 | |
| Diaminopropanol | | | | 900 | | | |
| Hexylamine | | | 1,000 | | | | |
| Reaction Product | 3 | 3 | .5 | 1 | 5 | 3 | 4 |
| Lead Naphthenate | 5 | | 2 | 2 | 5 | | |
| Lead Sulfonate | | 2 | | | | | 3 |
| Zinc Naphthenate | | | | | | 5 | |
| Armeen 16D [1] | 3 | | 5 | | 3 | 2 | 3 |
| Linseed Oil | 2 | | | 3 | 3 | 1 | 2 |

[1] Mixed C₁₆ alkylamines.

Example II

Approximately 2800 parts of castor oil and 750 parts of diethanolamine are heated at about 160° C. for about 16 hours while passing a stream of natural gas through the mixture to assist in the removal of water. The resulting reaction product is a viscous greenish-brown liquid having a saponification number of 40 and an acid number of 4. This product is used in preparing the following compositions:

| Composition No. | 8 | 9 | 10 | 11 | 12 |
|---|---|---|---|---|---|
| Monoethanolamine, 20% aqueous | 3,000 | 3,000 | | | |
| Reaction Product | 3 | 4 | | 5 | 3 |
| Lead Naphthenate | 2 | 1 | 2 | 5 | 2 |
| Copper Naphthenate | | | 4 | | |
| Laurylamine | | | | | 3 |
| Dicyclohexylamine nitrite | 2 | | | 2 | 2 |
| Tung Oil | | 3 | | 2 | 2 |
| Kerosene | | | 8 | 15 | |
| Oleyl alcohol [1] | 0.03 | 0.05 | | | |

[1] Foam inhibitor.

Compositions 8 and 9 are inhibited absorbents for use in removing carbon dioxide from gases containing a relatively high preparation of the same. Compositions 10–12 are inhibitor concentrates suitable for addition directly to an amine or alkanol amine absorption system.

Example III

In order to test and demonstrate the effectiveness of the present method for inhibiting corrosion the following procedure was followed: Two 0.5″ x 6″ coupons of 10–15 steel are polished with emery, washed and accurately weighed. These test specimens are mounted side-by-side in a Teflon mounting on the head of a 4-liter rocking autoclave. The corrosion inhibitor is then placed in the autoclave, and the head is bolted on. The autoclave is purged with carbon dioxide to remove free air, and is closed and pressured up to 20 p. s. i. g. with carbon dioxide. About 4000 ml. of the absorbent is then pressured into the autoclave, and the latter is rocked to effect mixing of the contents. About 500 ml. of the solution is then withdrawn from the autoclave, the pressure is adjusted to about 20 p. s. i. g. with carbon dioxide, and the autoclave is heated at about 210°–240° F. under autogenous pressure for 24 or 96 hours according to the length of the test. Upon completion of the heating period, the autoclave is cooled and opened, and the test specimens are removed, washed and weighed. The following data were obtained following this test procedure with the following corrosion inhibiting compositions:

|  | A | B | C | D |
|---|---|---|---|---|
| Ninol [1] | 100 | 300 |  | 200 |
| Armeen 16D [2] | 125 | 300 | 500 |  |
| Lead Naphthenate | 200 | 500 | 500 |  |
| Linseed Oil | 75 | 200 | 200 | 300 |
| Amine Mixture [3] |  |  |  | 1,320 |

[1] Commercially available reaction product of mixed higher fatty acids and an alkanol amine.
[2] Mixed $C_{16}$ alkylamines.
[3] Mixture of 600 parts imidazoline, 600 parts hexadecylamine, 120 parts dicyclohexylamine nitrite.

| Test No. | Composition Tested | Duration of Test, Hrs. | Change in Wt. of Test Coupons, mgs. |
|---|---|---|---|
| 1 | Aqueous Monoethanolamine (25%) | 96 | −440.2 |
| 2 | Aqueous Monoethanolamine (25%) plus 0.5% Composition A. | 96 | +9.0 |
| 3 | Rich Monoethanolamine [1] | 72 | −489.6 |
| 4 | Rich Monoethanolamine [1] plus 0.4% Composition B. | 24 | +47.3 |
| 5 | Rich Monoethanolamine [1] plus 0.4% Composition C. | 72 | −253.2 |
| 6 | Rich Monoethanolamine [1] plus 0.4% Composition D. | 72 | −387.5 |

[1] Rich absorbent taken from commercial installation for removal of carbox dioxide from natural gas.

*Example IV*

The following composition was prepared:

|  | Gals. |
|---|---|
| Ninol | 10 |
| Lead Naphthenate | 20 |
| Armeen 16D | 15 |
| Linseed Oil | 15 |

This composition was melted in a steam-jacketed vessel and was introduced at a rate of about 1.2 gals./day into the top of the regeneration tower of a gas treating plant. Said plant was operated to reduce the carbon dioxide content of a natural gas stream from about 12 percent by volume to about 6.5 percent by volume, and employed about 7000 gallons of 20 percent aqueous monoethanolamine as the absorbent for the carbon dioxide. Inspection of steel test coupons inserted at various points in the system showed that substantially no corrosion occurred over a period of several weeks, and that the coupons were coated with an adherent corrosion-resistant film.

Other modes of applying the principle of my invention may be employed instead of those explained, change being made as regards the materials or methods employed, provided the steps and compositions stated by any of the following claims and the equivalent of such stated steps and compositions be employed.

I, therefore, particularly point out and distinctly claim as my invention:

1. In a process for separating acidic components from a gas mixture wherein said mixture is contacted with an absorbent comprising a compound selected from the class consisting of water-soluble aliphatic amines and alkanolamines which are free from carboxyl and carbonyl groups and which boil above about 100° C., the improvement which consists in adding to said absorbent (1) a metal soap selected from the class consisting of the alkaline-earth and heavy metal soaps of oil-soluble petroleum sulfonic acids and carboxylic acids containing at least about 8 carbon atoms and (2) the organic reaction product obtained by heating a mixture essentially comprising an alkanolamine containing between 2 and about 20 carbon atoms and a fatty material selected from the class consisting of fatty acids containing at least about 8 carbon atoms and fatty oils which contain fatty acid radicals containing at least about 8 carbon atoms while distilling water from the mixture, said heating being effected at such a temperature and for such a period of time that substantially the stoichiometric amount of water is removed, and said metal soap and said reaction product being employed in amounts sufficient to inhibit the corrosive effect of said absorbent on ferrous metals.

2. A method according to claim 1 wherein the combined weight of said metal salt and said reaction product represents between about 0.05 and about 2 percent of the weight of said absorbent, and the ratio of said metal soap to said reaction product is between about 85/15 and about 15/85.

3. A method according to claim 1 wherein said absorbent is an aqueous solution of an ethanolamine.

4. A method according to claim 1 wherein the metal soap is a heavy metal soap of an oil-soluble petroleum sulfonic acid and the reaction product is obtained by reacting an alkanolamine containing between 2 and about 20 carbon atoms with a fatty acid containing at least 8 carbon atoms at a temperature between about 100° C. and about 320° C. until substantially the stoichiometric amount of water has been distilled from the reaction mixture.

5. A method according to claim 1 wherein the metal soap is a heavy metal soap of an oil-soluble petroleum sulfonic acid and the reaction product is obtained by reacting an alkanolamine containing between 2 and about 20 carbon atoms with a fatty oil containing fatty acid radicals containing at least 8 carbon atoms at a temperature between about 100° C. and about 320° C. until substantially the stoichiometric amount of water has been distilled from the reaction mixture.

6. A method according to claim 1 wherein the metal soap is a heavy metal soap of a carboxylic acid containing at least about 8 carbon atoms and the reaction product is obtained by reacting an alkanolamine containing between 2 and about 20 carbon atoms with a fatty acid containing at least 8 carbon atoms at a temperature between about 100° C. and about 320° C. until substantially the stoichiometric amount of water has been distilled from the reaction mixture.

7. A method according to claim 1 wherein the metal soap is a heavy metal soap of a carboxylic acid containing at least about 8 carbon atoms and the reaction product is obtained by reacting an alkanolamine containing between 2 and about 20 carbon atoms with a fatty oil containing fatty acid radicals containing at least 8 carbon atoms at a temperature between about 100° C. and about 320° C. until substantially the stoichiometric amount of water has been distilled from reaction mixture.

8. A method according to claim 6 wherein the metal soap is lead naphthenate and the alkanolamine is an ethanolamine.

9. A method according to claim 7 wherein the metal soap is lead naphthenate and the alkanolamine is an ethanolamine.

10. In a process for separating acidic components from a gas mixture wherein said mixture is contacted with an absorbent comprising a compound selected from the class consisting of water-soluble aliphatic amines and alkanolamines which are free from carboxyl and carbonyl groups and which boil above about 100° C., the improvement which consists in adding to said absorbent (1) a metal soap selected from the class consisting of the alkaline-earth and heavy metal soaps of oil-soluble petroleum sulfonic acids and carboxylic acids containing at least about 8 carbon atoms, (2) the organic reaction product obtained by heating a mixture essentially comprising an alkanolamine containing between 2 and about 20 carbon atoms and a fatty material selected from the class consisting of fatty acids containing at least about 8 carbon atoms and fatty oils which contain fatty acid radicals containing at least about 8 carbon atoms while distilling water from the mixture, said heating being effected at such a temperature and for such a period of time that substantially the stoichiometric amount of water is so removed, and (3) an amine selected from the class consisting of aliphatic and cycloaliphatic amines containing at least about 10 carbon atoms and salts thereof; said metal soap, reaction product and amine being employed in amounts sufficient to inhibit the corrosive effect of said absorbent on ferrous metals.

11. In a process for separating acidic components from a gas mixture wherein said mixture is contacted with an absorbent comprising a compound selected from the class consisting of water-soluble aliphatic amines and alkanolamines which are free from carboxyl and carbonyl groups and which boil above about 100° C., the improvement which consists in adding to said absorbent (1) a metal soap selected from the class consisting of the alkaline-earth and heavy metal soaps of oil-soluble petroleum sulfonic acids and carboxylic acids containing at least about 8 carbon atoms, (2) the organic reaction product obtained by heating a mixture essentially comprising an alkanolamine containing between 2 and about 20 carbon atoms and a fatty material selected from the class consisting of fatty acids containing at least about 8 carbon atoms and fatty oils which contain fatty acid radicals containing at least about 8 carbon atoms while distilling water from the mixture, said heating being effected at such a temperature and for such a period of time that substantially the stoichiometric amount of water is so removed, (3) an amine selected from the class consisting of aliphatic and cycloaliphatic amines containing at least about 10 carbon atoms and salts thereof, and (4) a drying oil; said metal soap, reaction product, amine and drying oil being employed in amounts sufficient to inhibit the corrosive effect of said absorbent on ferrous metals.

12. In a process wherein a gaseous mixture comprising carbon dioxide is contacted with an aqueous solution of monoethanolamine, the method of preventing the corrosion of ferrous metals with which said solution comes in contact which comprises adding to said solution between about 0.05 and about 2 percent by weight of a corrosion inhibiting composition comprising (1) lead naphthenate, (2) the organic reaction product obtained by heating a mixture essentially comprising an ethanolamine and a fatty material selected from the class consisting of fatty acids containing at least about 8 carbon atoms and fatty oils containing fatty acid radicals containing at least about 8 carbon atoms while distilling water from the mixture, said heating being effected at such a temperature and for such a period of time that substantially the stoichiometric amount of water is so removed, (3) an amine selected from the class consisting of aliphatic and cycloaliphatic amines containing at least about 10 carbon atoms and salts thereof, and (4) a drying oil; said lead naphthenate and reaction product together comprising at least about one-third of said corrosion inhibiting composition and being employed in a ratio between about 85/15 and about 15/85.

13. An absorbent for acidic gases comprising an aqueous solution of an amine selected from the class consisting of water-soluble aliphatic amines and alkanolamines which are free from carboxyl and carbonyl groups and which boil above about 100° C., a metal soap selected from the class consisting of heavy metal soaps of oil-soluble petroleum sulfonic acids and carboxylic acids containing at least about 8 carbon atoms, and the organic product obtained by heating a mixture essentially comprising an alkanolamine containing between 2 and about 20 carbon atoms and a fatty material selected from the class consisting of fatty acids containing at least about 8 carbon atoms and fatty oils containing fatty acid radicals containing at least about 8 carbon atoms while distilling water from the mixture, said heating being effected at such temperature and for such a period of time that substantially the stoichiometric amount of water is so removed, said metal soap and said reaction product representing between about 0.05 and about 2 percent by weight of the entire composition and being present in a ratio between about 85/15 and about 15/85.

14. A composition according to claim 13 wherein said aqueous solution is an aqueous solution of an ethanolamine of between about 10 and about 30 percent strength by weight.

15. A composition according to claim 14 wherein said metal soap is a heavy metal naphthenate and said reaction product is obtained by reacting an ethanolamine with a material selected from the class consisting of fatty acids containing at least about 8 carbon atoms and fatty oils containing fatty acid radicals containing at least about 8 carbon atoms at a temperature between about 100° C. and about 320° C. until substantially the stoichiometric amount of water has been distilled from the reaction mixture.

16. An absorbent for acidic gases comprising an aqueous solution of an ethanolamine of between about 10 and about 30 percent strength containing between about 0.05 and about 2 percent by weight of a corrosion inhibiting composition comprising (1) a lead soap of a carboxylic acid containing at least about 8 carbon atoms, (2) the organic reaction product obtained by heating a mixture essentially comprising an ethanolamine and a fatty acid containing at least about 8 carbon atoms at a temperature between about 100° C. and about 320° C. until substantially the stoichiometric amount of water has been distilled from the reaction mixture, (3) an aliphatic amine containing at least about 10 carbon atoms, and (4) a drying oil; said lead soap and said reaction product together comprising at least one-third of said corrosion inhibiting composition and being in a ratio between about 85/15 and about 15/85.

17. An absorbent according to claim 16 wherein said lead soap is lead naphthenate.

18. An absorbent according to claim 16 wherein said aliphatic amine comprises mixed $C_{16}$ amines.

19. An absorbent according to claim 16 wherein said drying oil is linseed oil.

20. An absorbent for carbon dioxide comprising an aqueous solution of monoethanolamine of between about 10 and about 30 percent strength containing between about 0.05 and about 0.5 percent by weight of lead naphthenate, between about 0.05 and about 0.5 percent by weight of the organic reaction product obtained by heating a mixture essentially comprising an ethanolamine and a fatty acid containing at least about 8 carbon atoms at a temperature between about 100° C. and about 320° C. until substantially the stoichiometric amount of water has been distilled from the reaction mixture, between about 0.01 and about 0.25 percent by weight of mixed $C_{16}$ aliphatic amines, and between about 0.01 and about 0.25 percent by weight of linseed oil.

References Cited in the file of this patent

UNITED STATES PATENTS

| | | |
|---|---|---|
| 2,031,632 | Bottoms | Feb. 25, 1936 |
| 2,583,399 | Wachter et al. | Jan. 22, 1952 |
| 2,614,981 | Lytle | Oct. 21, 1952 |
| 2,668,748 | Asbury | Feb. 9, 1954 |